US012003919B2

(12) United States Patent
Ren et al.

(10) Patent No.: US 12,003,919 B2
(45) Date of Patent: Jun. 4, 2024

(54) SPEAKER BOX

(71) Applicant: AAC Microtech (Changzhou) Co., Ltd., Changzhou (CN)

(72) Inventors: Li Ren, Shenzhen (CN); Chaoyuan Li, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 180 days.

(21) Appl. No.: 17/876,539

(22) Filed: Jul. 29, 2022

(65) Prior Publication Data

US 2023/0217158 A1 Jul. 6, 2023

(30) Foreign Application Priority Data

Dec. 31, 2021 (CN) ......................... 202123449901.3

(51) Int. Cl.
*H04R 25/00* (2006.01)
*H04R 1/02* (2006.01)
*H04R 1/28* (2006.01)

(52) U.S. Cl.
CPC ............ *H04R 1/2888* (2013.01); *H04R 1/02* (2013.01); *H04R 2201/029* (2013.01)

(58) Field of Classification Search
CPC .. H04R 1/02; H04R 1/2888; H04R 2201/029; H04R 1/025; H04R 1/2873; H04R 2499/11
USPC .......................................................... 381/345
See application file for complete search history.

(56) References Cited

U.S. PATENT DOCUMENTS

2019/0379957 A1* 12/2019 Niu ...................... H04R 1/2873

* cited by examiner

*Primary Examiner* — Phylesha Dabney
(74) *Attorney, Agent, or Firm* — W&G Law Group

(57) ABSTRACT

Provided is a speaker box, including: an upper cover, an upper steel sheet; a lower cover, a lower steel sheet; a receiving space, an acoustic unit; and an insert plate arranged in the rear cavity. Upper and lower sides of the insert plate abut against the upper steel sheet and the lower steel sheet, respectively, a position of at least one of the upper steel sheet or the lower steel sheet aligned with the insert plate is provided with a fixing groove passing therethrough, and the insert plate is fixed to at least one of the upper steel sheet or the lower steel sheet through glue injection in the fixing groove. The speaker has characteristics of convenient mounting, good anti-shell vibration effect, and reduced mounting space.

10 Claims, 6 Drawing Sheets

A-A

B-B

SPEAKER BOX

TECHNICAL FIELD

The present disclosure relates to the field of electroacoustic conversion technologies and, in particular, to a speaker box.

BACKGROUND

With the advent of the era of mobile Internet, the number of intelligent mobile devices continues to rise. A speaker box is a common electronic component, mainly configured for playback of audio signals and widely used in intelligent audio playback devices such as mobile phones, game consoles, and navigators.

The speaker box in the related art includes a front cover, a rear cover assembled with the front cover to form a receiving space, an acoustic unit received in the receiving space, and a sound output channel formed in the acoustic unit. The acoustic unit and the front cover jointly define a front sound cavity. The acoustic unit, the rear cover and the front cover jointly define a rear cavity. The sound output channel and the front sound cavity jointly form a front cavity and the sound output channel communicates the front sound cavity with the outside. In order to improve powder sealing of a speaker, an upper part of an insert plate between an upper cover and a lower cover is glued prior to assembly of the lower cover, and then the lower cover undergoes ultrasonic to realize soft contact of a steel sheet of the lower cover with the insert plate, thereby preventing shell vibration between the insert plate and the lower cover.

However, in the related art, the upper cover and the lower cover are fixed by glue, and since a control effect of glue is undesired during gluing, it is easy to make an overall height of the insert plate excessively high after the fixing by glue, thereby increasing an overall volume of the speaker box.

Therefore, there is a need to provide a new speaker box to solve the above technical problem.

SUMMARY

A technical problem to be solved by the present disclosure is to provide a speaker box with convenient mounting, a good anti-shell vibration effect, and a reduced mounting space.

In order to solve the above technical problem, the present disclosure provides a speaker box, including: an upper cover including an upper cover body, an upper cover port passing through the upper cover body, and an upper steel sheet fixed to the upper cover body and completely covering the upper cover port; a lower cover including a lower cover body, a lower cover port passing through the lower cover body, and a lower steel sheet fixed to the lower cover body and completely covering the lower cover port; a receiving space, the upper cover and the lower cover are assembled to form the receiving space; an acoustic unit received in the receiving space and dividing the receiving space into a front sound cavity and a rear cavity; and an insert plate arranged in the rear cavity. Upper and lower sides of the insert plate abut against the upper steel sheet and the lower steel sheet, respectively, a position of at least one of the upper steel sheet or the lower steel sheet aligned with the insert plate is provided with a fixing groove passing therethrough, and the insert plate is fixed to at least one of the upper steel sheet or the lower steel sheet through glue injection in the fixing groove.

As an improvement, the fixing groove has a sinking groove structure.

As an improvement, the insert plate divides the rear cavity into a first rear cavity and a second rear cavity, the acoustic unit is located in the first rear cavity, and the second rear cavity is configured to form a virtual sound cavity; and the insert plate is provided with a vent passing therethrough and communicating the first rear cavity with the second rear cavity.

As an improvement, a thickness of the injected glue is less than or equal to a depth of the fixing groove.

As an improvement, the fixing groove includes a ring-shaped connecting portion formed by recessing and extending from the lower steel sheet toward the upper cover, a support portion formed by extending from the connecting portion to an inner side thereof, and a via passing through the support portion, and the via is arranged corresponding to the insert plate.

As an improvement, the via is formed at a geometric center of the support portion.

As an improvement, a surface of one side of the insert plate close to the fixing groove is recessed in a direction away from the fixing groove to form a limit groove, and an outer peripheral side of the connecting portion engages with the limit groove.

As an improvement, the insert plate includes a long insert plate parallel to at least one of a major-axis side of the acoustic unit or a short insert plate parallel to a minor-axis side of the acoustic unit, and the limit groove matches at least one of the long insert plate or the short insert plate.

As an improvement, the upper cover further includes a support wall formed by extending from the upper cover body toward the lower cover, and the acoustic unit is fixedly supported on the support wall.

As an improvement, the upper steel sheet and the upper cover are formed into one piece by injection molding.

As an improvement, the lower steel sheet and the lower cover are formed into one piece by injection molding.

Compared with the related art, in the speaker box according to the present disclosure, a lower steel sheet is arranged on the lower cover, an insert plate is arranged between the lower cover and the upper cover, the insert plate is arranged in the rear cavity, the insert plate divides the back cavity into a first back cavity and a second back cavity, the acoustic unit is located in the first back cavity, and the second back cavity is configured to form a virtual sound cavity; the insert plate is provided with a vent passing therethrough and communicating the first back cavity with the second back cavity; upper and lower sides of the insert plate abut against the upper steel sheet and the lower steel sheet respectively, positions of the upper steel sheet and/or the lower steel sheet aligned with the insert plate are/is provided with a fixing groove passing therethrough, and the insert plate is fixed to the upper steel sheet and/or the lower steel sheet through glue injection in the fixing groove. With the structure, after the upper and lower covers are assembled, glue is added to the fixing groove to realize sealing. On the one hand, the insert plate can be fixed, effectively preventing the influence on the height caused by addition of the glue to the insert plate. On the other hand, after the insert plate is fixed by glue injection, the glue has elasticity after solidification, forming a buffer at a junction between the insert plate and the steel sheet, thereby effectively preventing the problem of shell vibration. Compared with an existing manner of adding glue to the insert plate, the process is simpler, and standard operations are implemented more easily.

BRIEF DESCRIPTION OF DRAWINGS

In order to better illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in embodiments of the present disclosure will be described below with reference to the accompanying drawings in the embodiments of the present disclosure. The described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
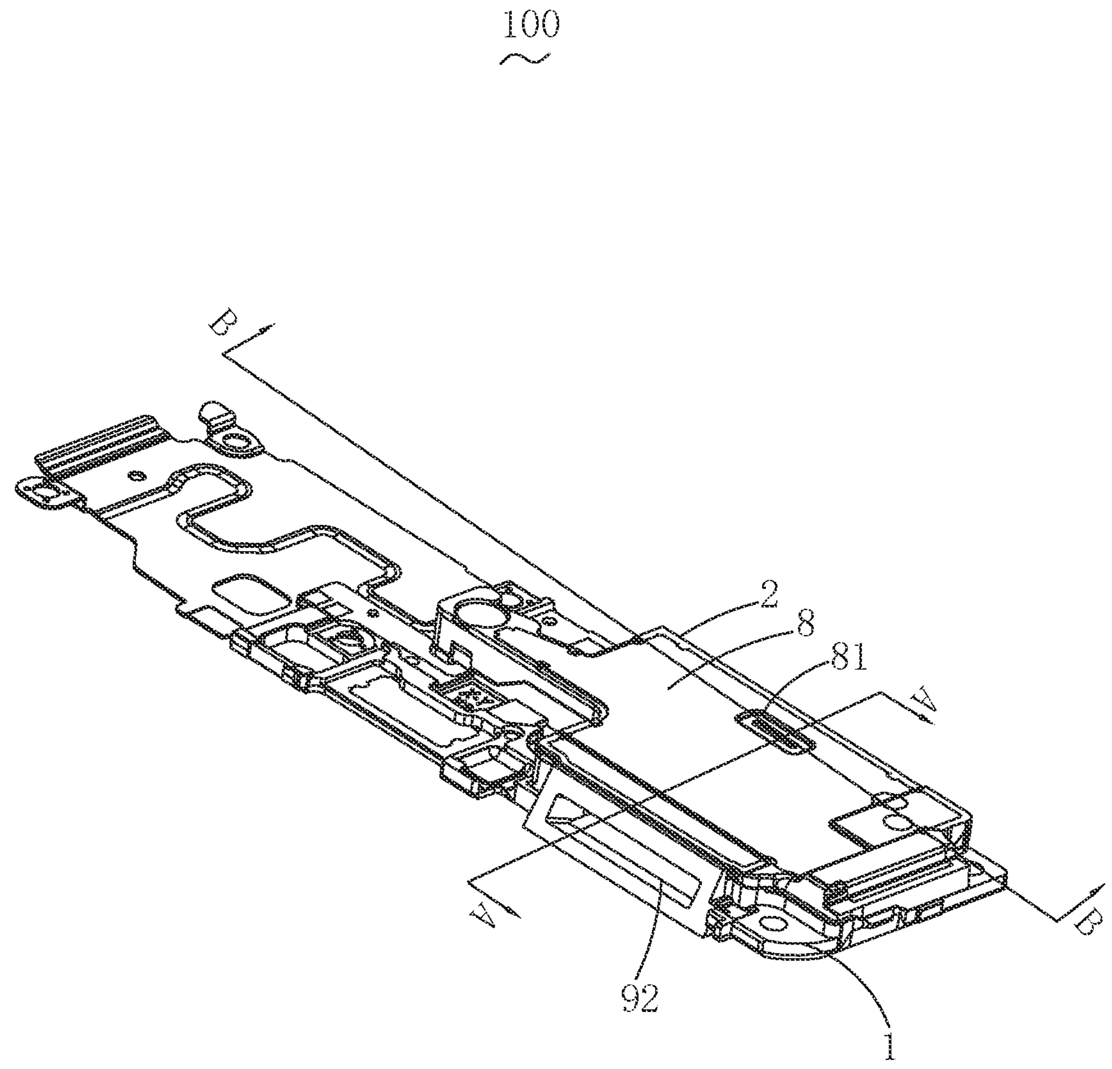
FIG. 1 is a schematic diagram of a perspective structure of a speaker box according to the present disclosure.
Figure 2:
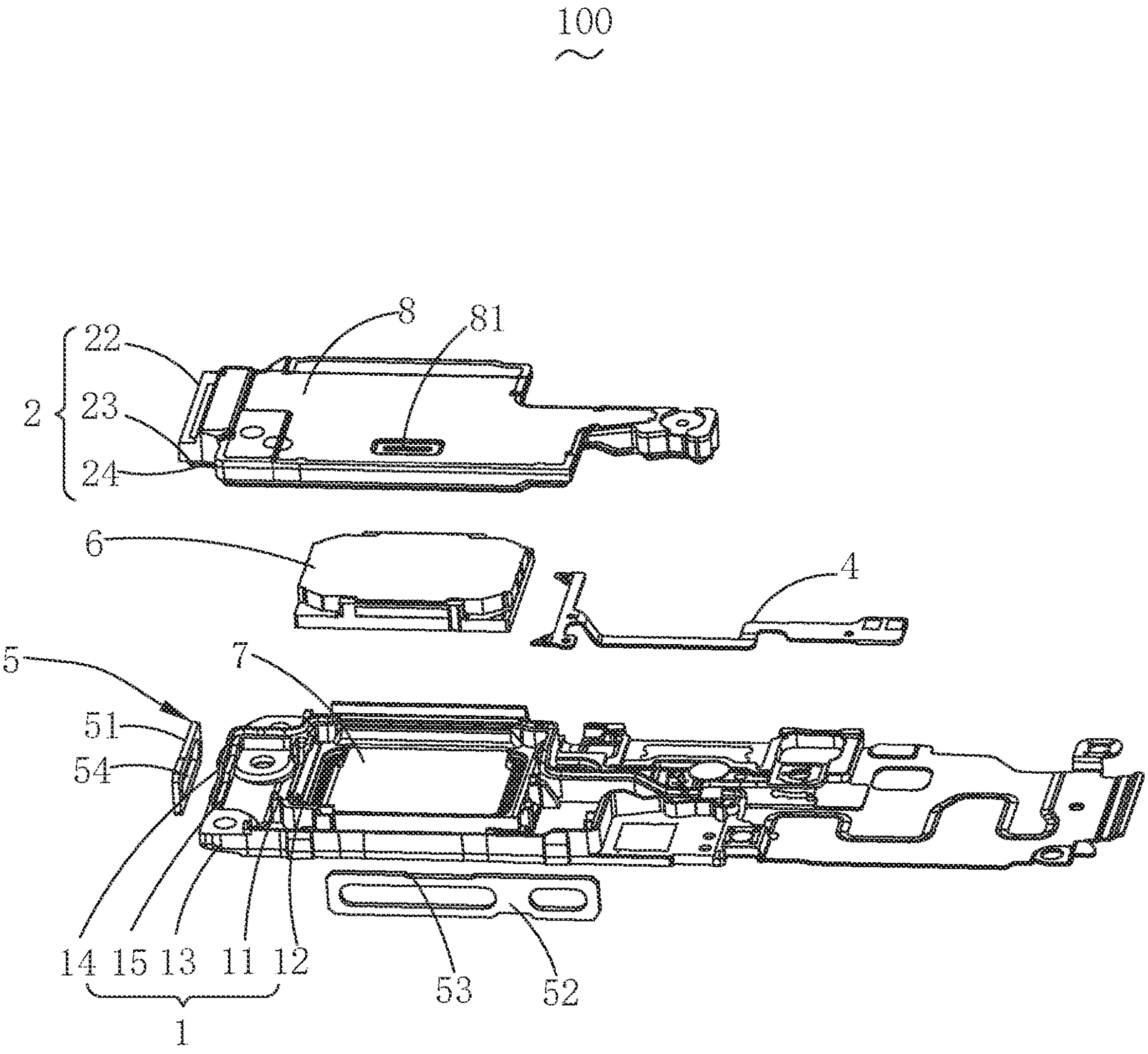
FIG. 2 is an exploded view of a speaker box according to the present disclosure.
Figure 3:
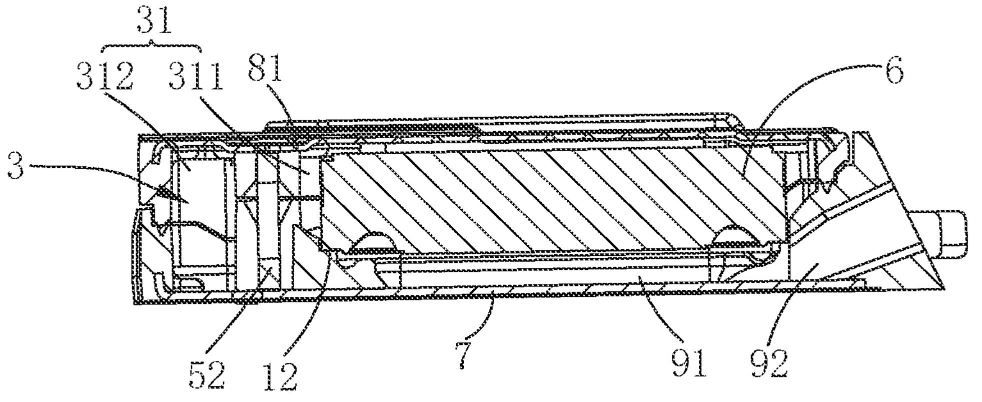
FIG. 3 is a sectional view taken along a line A-A in FIG. 1.
Figure 4:
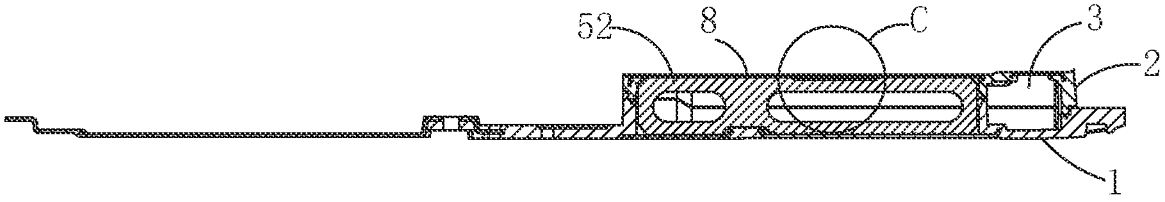
FIG. 4 is a sectional view taken along a line B-B in FIG. 1.
Figure 5:
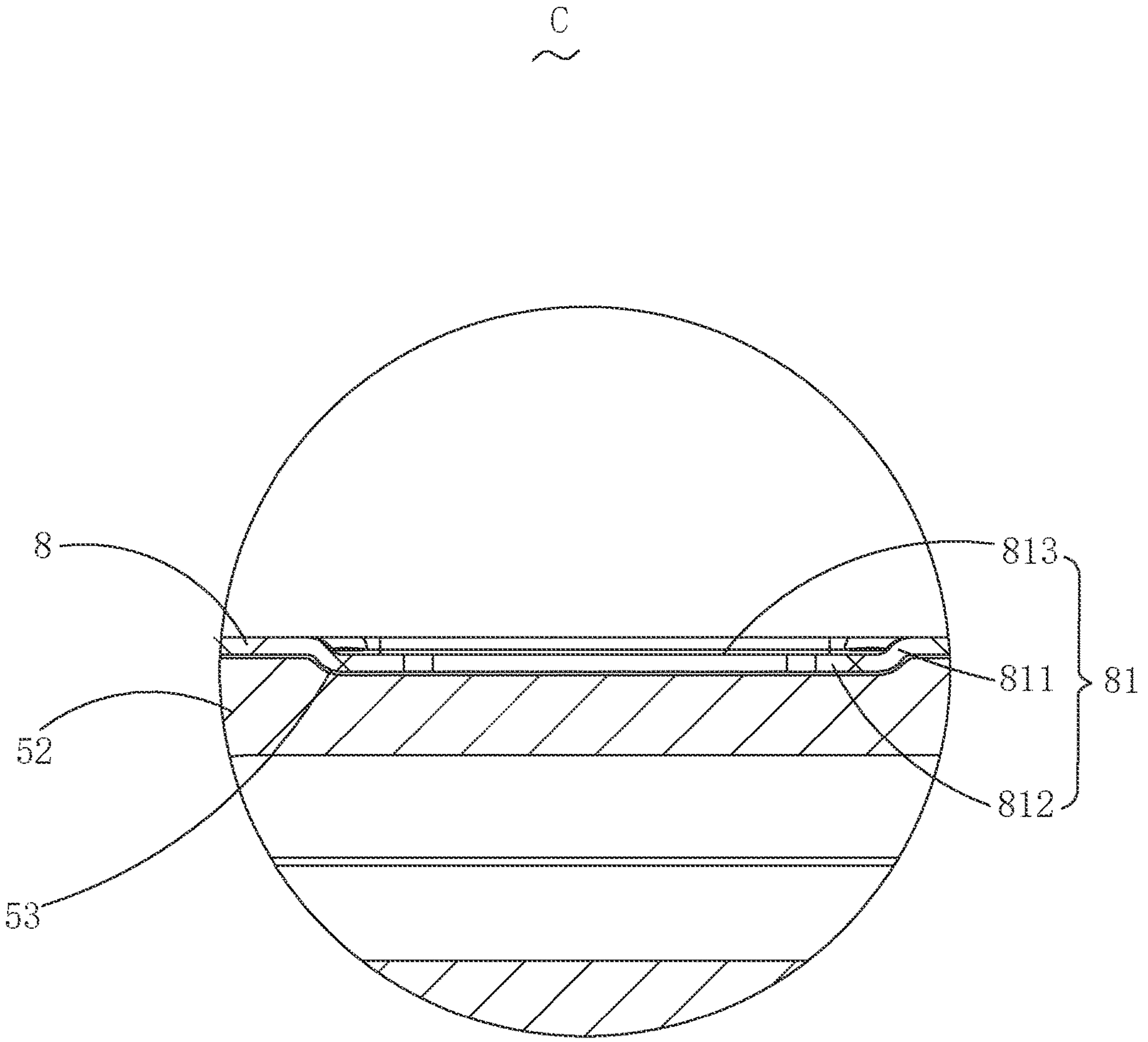
FIG. 5 is an enlarged view of part C in FIG. 4.
Figure 6:
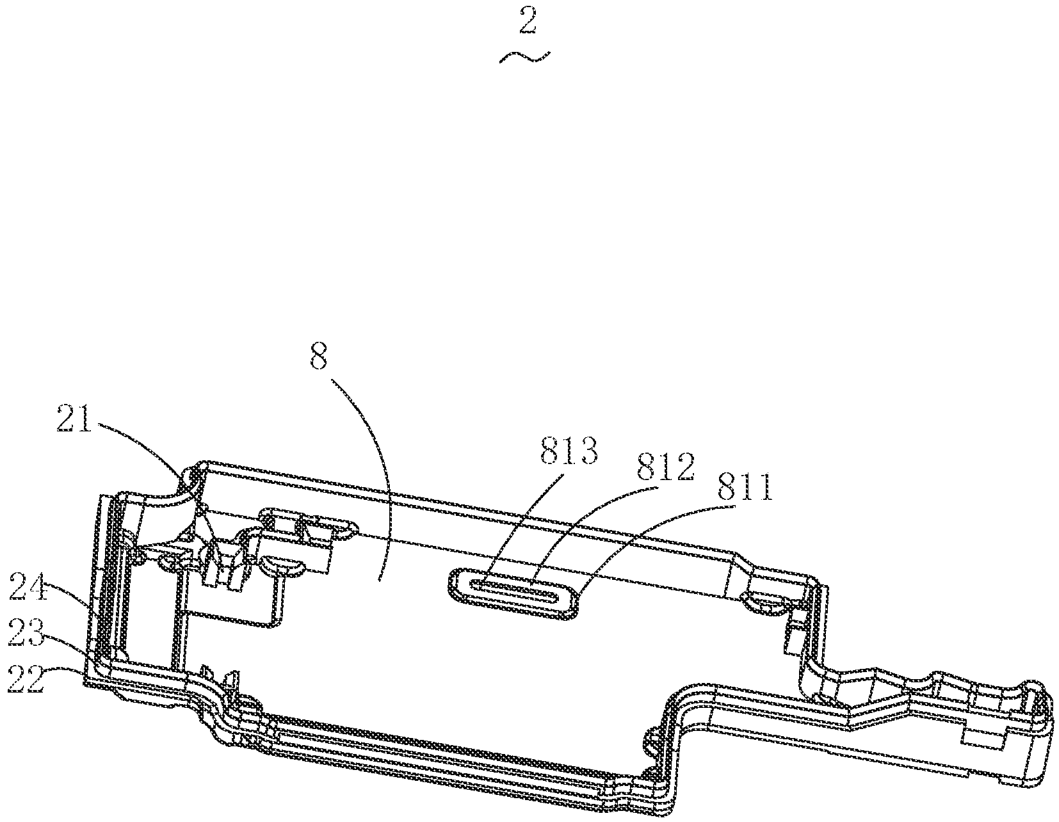
FIG. 6 is a schematic structural diagram of a lower cover of a speaker box according to the present disclosure.

Referring to FIG. 1 to FIG. 6, according to some embodiments of the present disclosure, a speaker box 100 is provided, including an upper cover 1, a lower cover 2, a receiving space 3, an acoustic unit 6, a sound channel 92, an insert plate 5, and an air-permeable isolation member (not shown in the figures).

The upper cover 1 includes an upper cover body 13, an upper cover port (not shown in the figures) passing through the upper cover body 13, and an upper steel sheet 7 fixed to the upper cover body 13 and completely covering the upper cover port. The lower cover 2 includes a lower cover body 22, a lower cover port (not shown in the figures) passing through the lower cover body 22, and a lower steel sheet 8 fixed to the lower cover body 22 and completely covering the lower cover port. The upper steel sheet 7 is configured to improve structural strength of the upper cover 1. The lower steel sheet 8 is configured to improve structural strength of the lower cover 2.

The upper cover 1 and the lower cover 2 are assembled to form the receiving space 3. The acoustic unit 6 is received in the receiving space 3. The acoustic unit 6 divides the receiving space 3 into a front sound cavity 91 and a rear cavity 31. The sound channel 92 is formed on one side of the upper cover 1. The sound channel 92 communicates the front sound cavity 91 with the outside and the sound channel 92 and the front sound cavity 91 jointly defines a front cavity 9.

The insert plate 5 is arranged in the rear cavity. The insert plate 5 divides the rear cavity into a first rear cavity 311 and a second rear cavity 312. The acoustic unit is located in the first rear cavity 311. The second rear cavity 312 is configured to form a virtual sound cavity. The insert plate 5 is provided with a vent 54 passing therethrough and communicating the first rear cavity 311 with the second rear cavity 312. The air-permeable isolation member is attached to the insert plate 5 and completely covers the vent 54, for encapsulating sound-absorbing materials in the second rear cavity 312.

Upper and lower sides of the insert plate 5 abut against the upper steel sheet 7 and the lower steel sheet 8, respectively, a position of the upper steel sheet 7 and/or the lower steel sheet 8 aligned with the insert plate 5 is provided with a fixing groove 81 passing therethrough, and the insert plate 5 is fixed to the upper steel sheet 7 and/or the lower steel sheet 8 through glue injection in the fixing groove 81. After the upper and lower covers are assembled, glue is added to the fixing groove 81 to realize sealing. On the one hand, the insert plate 5 can be fixed, effectively preventing the influence on the height caused by addition of the glue to the insert plate 5. On the other hand, after the insert plate 5 is fixed by glue injection, the glue has elasticity after solidification, forming a buffer at a junction between the insert plate 5 and the steel sheet, thereby effectively preventing the problem of shell vibration. Compared with an existing manner of adding glue to the insert plate 5, the process is simpler, and standard operations are implemented more easily.

In an embodiment, the fixing groove 81 is formed on the lower steel sheet 8. A fixing groove 81 is formed by recessing on the lower steel sheet 8. The fixing groove 81 is correspondingly arranged above the insert plate 5. The lower cover 2 and the insert plate 5 are sealed and fixed by glue injection in the fixing groove 81.

The fixing groove 81 is of a sinking groove structure. With the sinking groove structure, after the upper cover and the lower cover 2 are assembled, glue is added to the sinking groove structure to realize sealing. At the same time, the insert plate 5 is fixed by glue, thereby effectively alleviating the shell vibration.

In an embodiment, a thickness of the glue injection is less than or equal to a depth of the fixing groove 81. The problem of a large overall volume of the speaker box 100 affected by excessively high glue injection is effectively prevented, and a sealing and fixing effect can also be improved.

In an embodiment, the fixing groove 81 includes a ring-shaped connecting portion 811 formed by recessing and extending from the lower steel sheet 8 toward the upper cover 1, a support portion 812 formed by extending from the connecting portion 811 to an inner side thereof, and a via 813 passing through the support portion 812, and the via 813 is arranged corresponding to the insert plate 5.

The connecting portion 811 is formed by recessing and extending from the lower steel sheet 8, the support portion 812 formed by extending the connecting portion 811 inward forms a support against a surface of the insert plate 5, a via 813 is arranged at a position of the support portion 812 corresponding to the insert plate 5, and the insert plate 5 and the lower steel sheet 8 are fixedly connected by glue injection in the via 813, so as to effectively alleviate overall shell vibration of the speaker box 100.

Optionally, the support portion 812 is of a ring-shaped structure, and the via 813 is also of a ring-shaped structure.

Further, a width of the via 813 and a thickness of the insert plate 5 are appropriately defined or equal to each other, so that leakage outside the via 813 may not occur during the glue injection, the sealing effect is good, and costs are saved at the same time.

The via 813 is formed at a geometric center of the support portion 812. After glue injection in the via 813 for fixing, the overall force is uniform.

In an embodiment, a surface of one side of the insert plate 5 close to the fixing groove 81 is recessed to a direction away from the fixing groove 81 to form a limit groove 53, and an outer peripheral side of the connecting portion 811 engages with the limit groove 53. An orthographic projection of the via 813 is located within the limit groove 53. Side walls of the connecting portion 811 engage with the limit groove 53, thereby improving a mutual limiting effect of the connecting portion 811 and the limit groove 53. An orthographic projection of the via 813 is located within the limit groove 53, and glue injection in the via 813 enables glued fixing between the via 813 and the limit groove 53, thereby improving a fixing effect of the lower steel sheet 8 and the insert plate 5 and effectively alleviating the shell vibration.

The insert plate 5 includes a long insert plate 52 parallel to a major-axis side of the acoustic unit 6 and/or a short insert plate 51 parallel to a minor-axis side of the acoustic unit 6, and the limit groove 53 matches the long insert plate 52 and/or the short insert plate 51.

Optionally, the limit groove 53 is formed by recessing from a surface of one side of the long insert plate 52 close to the fixing groove 81 to a direction away from the fixing groove 81.

In an embodiment, the upper cover 1 further includes a support wall 12 formed by extending from the upper cover body 13 toward the lower cover 2, and the acoustic unit 6 is fixedly supported on the support wall 12.

The lower steel sheet 8 and the lower cover 2 are integrated by injection molding, thereby improving overall structural strength and production efficiency of the lower steel sheet 8 and the lower cover 2. The upper steel sheet 7 and the upper cover 1 are integrated by injection molding, thereby improving overall structural strength and production efficiency of the upper steel sheet 7 and the upper cover 1.

In an embodiment, the speaker box 100 further includes a circuit board 4. The circuit board 4 has one end electrically fixed to the acoustic circuit 6 and the other end extending outside the receiving space 3 via the rear cavity 31.

In an embodiment, the upper cover 1 further includes a boss 14 formed by extending from the upper cover body 13 toward the lower cover 2 and a limit recess 15 formed by recessing from the boss 14 toward the upper cover body 13. The lower cover 2 further includes a connecting wall 23 extending from the lower cover body 22 toward the upper cover 1 and a limit block 24 formed by recessing inward from the connecting wall 23.

The limit block 24 engages with the limit recess 15. This facilitates the assembly of the upper cover 1 and the lower cover 2.

In an embodiment, the insert plate 5 is arranged on an outer side of the acoustic unit 6, the upper cover 1 is recessed inward to form a first slot 11, the lower cover 2 is recessed inward to form a second slot 21, and the insert plate 5 is arranged in the first slot 11 and the second slot 21. Two sides of the insert plate 5 are arranged in the first slot 11 and the second slot 21, respectively, to realize engagement and fixing of the upper cover 1 and the lower cover 2.

Compared with the related art, in the speaker box 100 according to the present disclosure, a lower steel sheet is arranged on the lower cover, an insert plate is arranged between the lower cover and the upper cover, the insert plate is arranged in the rear cavity, the insert plate divides the back cavity into a first back cavity and a second back cavity, the acoustic unit is located in the first back cavity, and the second back cavity is configured to form a virtual sound cavity. The insert plate is provided with a vent passing therethrough and communicating the first back cavity with the second back cavity. Upper and lower sides of the insert plate abut against the upper steel sheet and the lower steel sheet, respectively, positions of the upper steel sheet and/or the lower steel sheet aligned with the insert plate are/is provided with a fixing groove passing therethrough, and the insert plate is fixed to the upper steel sheet and/or the lower steel sheet through glue injection in the fixing groove. With the structure, after the upper and lower covers are assembled, glue is added to the fixing groove to realize sealing. On the one hand, the insert plate can be fixed, thereby effectively preventing the influence on the height caused by addition of the glue to the insert plate. On the other hand, after the insert plate is fixed by glue injection, the glue has elasticity after solidification, forming a buffer at a junction between the insert plate and the steel sheet, thereby effectively preventing the problem of shell vibration. Compared with an existing manner of adding glue to the insert plate, the process is simpler, and standard operations are implemented more easily.

The above are only embodiments of the present disclosure. It should be pointed out that, for those of ordinary skill in the art, improvements can also be made without departing from the creative concept of the present disclosure, all of which fall within the protection scope of the present disclosure.

What is claimed is:

1. A speaker box, comprising:

an upper cover comprising an upper cover body, an upper cover port passing through the upper cover body, and an upper steel sheet fixed to the upper cover body and completely covering the upper cover port;

a lower cover comprising a lower cover body, a lower cover port passing through the lower cover body, and a lower steel sheet fixed to the lower cover body and completely covering the lower cover port;

a receiving space, wherein the upper cover and the lower cover are assembled to form the receiving space;

an acoustic unit received in the receiving space and dividing the receiving space into a front sound cavity and a rear cavity; and an insert plate arranged in the rear cavity;

wherein upper and lower sides of the insert plate abut against the upper steel sheet and the lower steel sheet, respectively, a position of at least one of the upper steel sheet or the lower steel sheet aligned with the insert plate is provided with a fixing groove passing therethrough, and the insert plate is fixed to at least one of the upper steel sheet or the lower steel sheet through glue injection in the fixing groove.

2. The speaker box as described in claim 1, wherein the fixing groove has a sinking groove structure.

3. The speaker box as described in claim 1, wherein the insert plate divides the rear cavity into a first rear cavity and a second rear cavity, the acoustic unit is located in the first rear cavity, and the second rear cavity is configured to form a virtual sound cavity; and the insert plate is provided with a vent passing therethrough and communicating the first rear cavity with the second rear cavity.

4. The speaker box as described in claim 1, wherein a thickness of the injected glue is less than or equal to a depth of the fixing groove.

5. The speaker box as described in claim 1, wherein the fixing groove comprises a ring-shaped connecting portion formed by recessing and extending from the lower steel sheet toward the upper cover, a support portion formed by extending from the connecting portion to an inner side thereof, and a via passing through the support portion, and the via is arranged corresponding to the insert plate.

6. The speaker box as described in claim 5, wherein the via is formed at a geometric center of the support portion.

7. The speaker box as described in claim 6, wherein a surface of one side of the insert plate close to the fixing groove is recessed in a direction away from the fixing groove to form a limit groove, and an outer peripheral side of the connecting portion engages with the limit groove.

8. The speaker box as described in claim 7, wherein the insert plate comprises a long insert plate parallel to at least one of a major-axis side of the acoustic unit or a short insert plate parallel to a minor-axis side of the acoustic unit, and the limit groove matches at least one of the long insert plate or the short insert plate.

9. The speaker box as described in claim 1, wherein the upper cover further comprises a support wall formed by extending from the upper cover body toward the lower cover, and the acoustic unit is fixedly supported on the support wall.

10. The speaker box as described in claim 1, wherein the upper steel sheet and the upper cover are formed into one piece by injection molding, and the lower steel sheet and the lower cover are formed into one piece by injection molding.

* * * * *